United States Patent
Feola et al.

(10) Patent No.: US 12,466,975 B2
(45) Date of Patent: Nov. 11, 2025

(54) COATING COMPOSITION

(71) Applicant: ALLNEX AUSTRIA GmbH, Werndorf (AT)

(72) Inventors: Roland Feola, Graz (AT); Oliver Etz, Mainz (DE); Richard Hendrikus Gerrit Brinkhuis, Zwolle (NL); Florian Lunzer, Brussels (BE)

(73) Assignee: ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 18/280,577

(22) PCT Filed: Mar. 10, 2022

(86) PCT No.: PCT/EP2022/056120
§ 371 (c)(1),
(2) Date: Sep. 6, 2023

(87) PCT Pub. No.: WO2022/189540
PCT Pub. Date: Sep. 15, 2022

(65) Prior Publication Data
US 2024/0141200 A1    May 2, 2024

(30) Foreign Application Priority Data

Mar. 12, 2021 (EP) .................................. 21162386
Dec. 10, 2021 (EP) .................................. 21213803

(51) Int. Cl.
| C09D 167/06 | (2006.01) |
| B05D 7/14 | (2006.01) |
| C08G 63/183 | (2006.01) |

(52) U.S. Cl.
CPC ............ *C09D 167/06* (2013.01); *B05D 7/14* (2013.01); *C08G 63/183* (2013.01); *B05D 2202/00* (2013.01); *B05D 2508/00* (2013.01)

(58) Field of Classification Search
None
See application file for complete search history.

(56) References Cited

U.S. PATENT DOCUMENTS

| 4,452,954 A | 6/1984 | Schade et al. |
| 6,143,841 A | 11/2000 | Spittka et al. |
| 7,144,975 B2 | 12/2006 | Gloeckner et al. |
| 8,168,276 B2 | 5/2012 | Cleaver et al. |
| 8,449,960 B2 | 5/2013 | Skillman et al. |
| 9,200,176 B2 | 12/2015 | Skillman et al. |
| 10,370,152 B2 * | 8/2019 | Han .................. B65D 25/14 |
| 10,563,010 B2 | 2/2020 | Skillman et al. |
| 2019/0284400 A1 * | 9/2019 | Maral .................. B65D 25/34 |
| 2019/0359846 A1 * | 11/2019 | Fix .................. C09D 167/00 |
| 2020/0207516 A1 * | 7/2020 | Seneker .............. C09D 167/02 |

FOREIGN PATENT DOCUMENTS

| CN | 111164026 | 5/2020 |
| JP | 54-143494 | 11/1979 |
| WO | 2009/013063 | 1/2009 |
| WO | 2010/118356 | 10/2010 |
| WO | 2016/073711 | 5/2016 |
| WO | 2019/045944 | 3/2019 |

OTHER PUBLICATIONS

International Search Report (ISR) issued Jun. 9, 2022 in International (PCT) Application No. PCT/EP2022/056120.
Li Shijun et al., "Food Safety Guidelines for People", People's Military Medical Publishing House, Jul. 2006, pp. 90, with English-language translation.
"Second-level constructors Win in the examination site Construction engineering management and practice", China Public Education National Second-level Constructor Qualification Examination Book Writing Group, World Book Publishing Co., Ltd., Jul. 2020, pp. 233, with English-language translation.

* cited by examiner

*Primary Examiner* — Mark Kopec
*Assistant Examiner* — Lily K Sloan
(74) *Attorney, Agent, or Firm* — Wenderoth, Lind & Ponack, L.L.P.

(57) ABSTRACT

The present invention relates to a coating composition comprising a blend of polyesters, said blend comprising: —from 0.1 to 99.9% by weight of one or more saturated polyesters (A) and —from 99.9 to 0.1% by weight of one or more unsaturated polyesters (B), based on the total weight of polyesters (A) and (B); said one or more (A) and one or more (B) having a Weight Average Molecular Weight (Mw) of at least 15,000 g/mole, as measured by Gel Permeation Chromatograph using tetrahydrofuran as solvent, and a glass transition temperature, as measured by Differential Scanning Calorimetry, according to DIN EN 61006, method A, of at least 60° C. The present invention also relates to a high molecular weight polyester as such, the method for producing a coated substrate, the coated substrate as such, and use of the coating composition.

23 Claims, No Drawings

COATING COMPOSITION

FIELD OF THE INVENTION

The present invention is related to a coating composition comprising a blend of high molecular weight polyesters, and to a high molecular weight polyester as such. The present invention also relates to the method for producing a coated substrate, the coated substrate as such, and use of the coating composition.

BACKGROUND ART

Besides for aesthetic reasons, coatings intend to protect substrates against the destructive effects intentionally or accidentally affecting them. The coating should meet a substantial range of specific properties related to resistance to heat, ultraviolet irradiation, chemicals and mechanical forces among others.

The application of coatings to metal substrates, to retard or inhibit corrosion, is well established.

Coatings in general are applied to a wide variety of substrates either as a liquid to a substrate using any suitable procedure such as spray coating, roll coating, curtain coating, immersion coating, dip coating, and the like, or as a solid using fluidized bed or electrostatic deposition such as corona or tribo guns. For the particular case, where the coating is used to coat metal sheets or coils, the coating can be applied by roll coating.

A typical application of coatings relates to the interior and optionally the exterior of (light) metal packaging, more particularly metal can bodies and can ends in order to prevent the contents of said cans from contacting the metal. Contact between the metal and the packaged product can lead to corrosion of the metal, which can contaminate the packaged product.

Coating compositions for the inside of beer, beverage and food cans must be approved for direct food contact. The fundamental function of the inside coatings on can bodies and can ends (see for example "Polymeric Materials Science and Engineering", Volume 65, Fall Meeting 1991, New York, pages 277-278) is to protect the packed product to maintain its nutritional value, texture, colour and flavour when purchased and used by the consumer. To meet these requirements, the organic film must be free of any material which might extract into the packed product and must maintain its integrity over the product recommended shelf life.

Many of the coating compositions for food and beverage containers are based on polyether resins that are based on polyglycidyl ethers of bisphenol A. Bisphenol A in container coatings, either as bisphenol A itself or derivatives thereof, such as diglycidyl ethers of bisphenol A, epoxy novolak resins and polyols prepared with bisphenol A and bisphenol F, are problematic. Traces of bisphenol A diglycidyl ether from epoxy resin coating materials leach out of the interior coatings of preserve cans and are absorbed into the human organism together with the food. In oil-containing fish cans, indeed, inadmissibly high concentrations of bisphenol A diglycidyl ether, which leach from the interior coating, have been measured. Bisphenol A diglycidyl ether is now suspected on intake into the human organism of having brought about carcinogenic and estrogenic effects. Although the balance of scientific evidence available to date indicates that small trace amounts of bisphenol A or bisphenol A diglycidyl ether that might be released from existing coatings does not pose health risks to humans, these compounds are nevertheless perceived by some as being harmful to human health. Consequently, there is a strong desire to eliminate these compounds from coatings for food and beverage containers. Accordingly, what are desired are can coating compositions for food and beverage containers that do not contain extractable quantities of bisphenol A, bisphenol A diglycidyl ether or other derivatives of bisphenol A and yet have commercially acceptable properties.

Coatings for food and beverage containers should preferably be capable of high speed application to the substrate, as in coil coating or sheet coating operations, and provide the necessary properties when cured. The coating should generally be capable of maintaining suitable film integrity during container fabrication and be capable of withstanding the processing conditions that the container may be subjected to during product packaging. The precoated metal sheets are subjected to severe elongative and compressive stresses during the can forming process The integrity of the coating must be maintained during all the specific fabrication operations.

To address the shortcoming of the currently applied coating formulations, the packaging coatings industry has sought coatings based on alternative binder systems such as polyester resin systems. It has been problematic, however, to formulate polyester-based coatings that exhibit the required balance of coating characteristics (e.g., flexibility, adhesion, solvent resistance, sterilization resistance, etc.).

Polyester base coating for the interior surface of can bodies and can ends already are disclosed in a vast number of prior art documents.

U.S. Pat. No. 4,452,954 (A) discloses a coating comprising a polymer having a backbone that includes both ester and urethane linkages, and one or more polycyclic groups comprising a saturated bicyclic group, an aromatic bicyclic group, an at least tricyclic group, or a combination thereof, wherein the polymer is formed via reaction of a polyisocyanate compound and a hydroxyl-functional polyester oligomer or polymer having a hydroxyl number of 25 to 200.

EP 2416962 B1 discloses a coating composition comprising a binder polymer having one or more of backbone unsaturated cycloaliphatic groups with a double bond located between carbon atoms of a ring, wherein the unsaturated cycloaliphatic group comprises an unsaturated group that is at least bicyclic, and an iodine value of at least 10, determined by Test Method E "Iodine Value"; and a resole phenolic crosslinker.

U.S. Pat. No. 10,563,010 B2 discloses a coating composition comprising an unsaturated polyester polymer having an iodine value of at least 10; wherein the polyester polymer includes an ether linkage, or the coating composition includes a metal drier, or the polyester polymer includes an ether linkage and the coating composition includes a metal drier.

U.S. Pat. No. 9,200,176 B2 discloses a coating composition comprising a polyester polymer having a backbone or pendant unsaturated monocyclic cycloaliphatic group.

U.S. Pat. No. 8,449,960 B2 discloses a coating composition comprising a binder polymer having a glass transition temperature of at least 25° C., a backbone or pendant unsaturated at least bicyclic group with a double bond located between carbon atoms of a ring, and an iodine value of at least about 10; and a crosslinker.

U.S. Pat. No. 8,168,276 B2 discloses a coating prepared from a composition comprising a resin system comprising carboxylic groups, hydroxyl groups, or combinations thereof; a crosslinker comprising a phenolic crosslinker, an amino crosslinker, or a combination thereof; and a catalyst comprising a titanium-containing catalyst, a zirconium-containing catalyst, or a combination thereof; wherein the composition is substantially Bisphenol A-free.

WO 2016/073711(A1) discloses a thermosetting composition comprising a curable polyester resin; and a crosslinker composition comprising a resole phenolic resin, said phenolic resin containing the residues of un-substituted phenol and/or meta-substituted phenols.

U.S. Pat. No. 7,144,975 B2 discloses an unsaturated, amorphous polyester comprising at least one alpha, beta-unsaturated dicarboxylic acid component and one alcohol component, wherein the alcohol component comprises a dicidol mixture of the isomeric compounds 3,8-bis(hydroxymethyl)-tricyclo[$5.2.1.0^{2,6}$]decane, 4,8-bis (hydroxyl methyl)tricyclo[$5.2.1.0^{2,6}$]decane and 5,8-bis-(hydroxymethyl)tricycle [$5.2.1.0^{2,6}$]decane, where each isomer may be present in the mixture in a proportion of from 20 to 40% and the sum of the three isomers is from 90 to 100%, and at least 5% of the mixture is present in the alcohol component of the polyester. The unsaturated polyester resins of the examples are characterized by an acid number of about 25 mg KOH/g, an hydroxyl number of about 36 mg KOH/g, a glass transition temperature of 12° C. or less and a weight average molecular weight of 5,500 or less.

WO 2009/013063 A1 discloses non-yellowing, low-viscosity, unsaturated, amorphous polyesters, consisting of an acid component comprising from 10 to 100 mol % of at least one α, ß-unsaturated dicarboxylic acid, and from 0 to 90 mol % of at least one linear and/or branched, aliphatic and/or cycloaliphatic and/or aromatic di- and/or polyfunctional carboxylic acid; and comprising an alcohol component from 5 to 100 mol % of a dicidol mixture, and from 0 to 95 mol % of at least one di- and/or polyfunctional alcohol, The polyesters are characterized by a glass transition temperature comprised −30° C. and +90° C. and a weight average molecular weight comprised between 900 and 27,000, preferably 1,000 and 15,000 g/mole.

U.S. Pat. No. 6,143,841 (A) discloses a coating formulation consisting of:
  A) a thermoplastic base polyester consisting of the copolymerization product of at least one aliphatic, cycloaliphatic and/or aromatic polybasic acid and/or anhydride thereof or at least one hydroxycarboxylic acid or derivative thereof and at least one diol;
  B) an unsaturated additive polyester resin prepared by condensing at least one unsaturated dicarboxylic acid and optionally at least one saturated dicarboxylic acid monomer with at least one diol and/or triol, wherein the proportion of unsaturated additive polyester to base polyester ranges from 0.1-15 parts to 99.9-85 parts; and
  C) at least one substance selected from the group consisting of colour pigments, fillers, stabilizers, levelling agents and luster agents.

The diol used to prepare the unsaturated additive polyester is 3 (4), 8 (9) bis-(hydroxymethyl) tricyclo-(5,2,10,2,6) decane; the unsaturated dicarboxylic acid monomer used to prepare the unsaturated additive polyester is maleic, fumaric, mesaconic, citraconic, itaconic and/or tetrahydrophthalic acid. The base polyester has a glass transition temperature ranging from 10 to 40° C., and a melting range of 160 to 180° C.

Polyester-based coatings systems, being substantially Bisphenol free, in general lack one or more film properties compared to coating systems based on polyether resins comprising (or made of) polyglycidyl ethers of bisphenol.

AIM OF THE INVENTION

The present invention aims to provide a coating composition that does not present the drawbacks of the prior art.

It is the aim of the present invention to provide a coating composition with improved solvent resistance, substrate adhesion and flexibility.

It is a further aim of the present invention to provide a coating composition for coils and cans.

Another aim is to provide a can coating composition presenting a combination of properties equal to or better than the state of the art products in the market while abstaining from HSE/FDA suspect substances like Bisphenol A, Bisphenol F, formaldehyde and isocyanates.

SUMMARY OF THE INVENTION

The present invention discloses a coating composition comprising a blend of polyesters, said blend comprising:
  from 0.1 to 99.9% by weight of one or more saturated polyesters (A), and
  from 99.9 to 0.1% by weight of one or more unsaturated polyesters (B),
based on the total weight of polyesters (A) and (B);
said one or more (A) and one or more (B) having a Weight Average Molecular Weight (Mw) of at least 15,000 g/mole, as measured by Gel Permeation Chromatograph using tetrahydrofuran as solvent, and a glass transition temperature, as measured by Differential Scanning Calorimetry, according to DIN EN 61006, method A, of at least 60° C.;

Preferably, the one or more (A) and/or the one or more (B) comprise aliphatic cyclic groups;

Preferred embodiments of the present invention disclose one or more of the following features:
  one or more (A) and/or the one or more (B) comprise(s) aliphatic bicyclic groups and/or tricyclic groups, preferably aliphatic tricyclic groups;
  one or more (A) and/or the one or more (B) are obtained from esterification of polycarboxylic acids (and/or anhydrides) and polyols comprising aliphatic polycyclic diol(s) selected from the group consisting of bicyclic diols and tricyclic diols and mixtures thereof;
  one or more of the one or more (A) and/or the one or more (B) preferably are obtained from esterification of polycarboxylic acids and polyols comprising aliphatic tricyclic diols selected from the group consisting of 3,8-bis(hydroxymethyl)-tricyclo[$5.2.1.0^{2,6}$]decane, 4,8-bis(hydroxymethyl)-tricyclo[$5.2.1.0^{2,6}$]decane, and 5,8-bis-(hydroxymethyl)-tricyclo[$5.2.1.0^{2,6}$]decane and mixtures thereof;
  one or more (B) comprises unsaturated diacid(s) or anhydride(s) selected from the group consisting of alpha, beta-unsaturated dicarboxylic acids, alpha, beta-unsaturated acid anhydrides, unsaturated diacids comprising an isolated ethylenically unsaturated double bond, unsaturated acid anhydrides comprising an isolated ethylenically unsaturated double bond, and mixtures thereof;
  the coating composition comprises between 35 and 50% by weight of the blend comprising one or more (A) and one or more (B) and between 50 and 65% by weight of one or more organic solvent(s) selected from the group consisting of aliphatic hydrocarbons, aromatic hydrocarbons, alcohols, ketones, esters, glycols, glycol ethers, and glycol esters, and mixtures thereof;

The present invention further discloses a method for producing a coated metal substrate comprising the steps of:
  applying the coating composition on at least one side of an, optionally pretreated and/or primer comprising, metal substrate, at a coating thickness adjusted to obtain a dry coating (or dry film) thickness of less than 60 µm;

stoving the applied coating composition at a temperature of at least 150° C. for a period of at least 20 seconds, to form the metal substrate coated with the cross-linked coating layer;

The present invention further discloses a method for producing coated can bodies and can ends comprising the steps of:

cutting a coated metal substrate into metal pieces of desired dimensions and shape to form a can body and can ends, ready to be assembled, or cutting a coated metal substrate into metal pieces of desired dimensions and shape and embossing a metal piece into a can body and cutting the can ends into the desired shape, ready to be assembled.

DETAILED DESCRIPTION OF THE INVENTION

The coating formulation (or coating composition) according to the present invention comprises a blend of one or more saturated polyesters (A) and one or more unsaturated polyesters (B), said blend comprising:

from 0.1 to 99.9% by weight, preferably from 0.5 to 99.5% by weight, more preferably from 1 to 99% by weight, even more preferably from 5 to 95% by weight, still even more preferably from 10 to 90% by weight, still even more preferably from 15 to 85% by weight, or even from 20 to 80% by weight, most preferably from 35 to 80% by weight of one or more saturated polyesters (A); and from 99.9 to 0.1% by weight, preferably from 99.5 to 0.5% by weight, more preferably from 99 to 1% by weight, even more preferably from 95 to 5% by weight, still even more preferably from 90 to 10% by weight, still even more preferably from 85 to 15% by weight, or even from 80 to 20% by weight, most preferably from 65 to 20% by weight of one or more unsaturated polyesters (B);

based on the total weight of polyesters (A) and (B).

Preferably, the one or more saturated polyesters (A) and/or the one or more unsaturated polyesters (B) comprise one or more aliphatic cyclic group(s) in the polyester backbone, more preferably, the one or more saturated polyesters (A) and/or the one or more unsaturated polyesters (B) comprise between 10 and 70% by weight, even more preferably between 15 and 65% by weight, still even more preferably between 20 and 60% by weight, most preferably between 25 and 60% by weight of one or more aliphatic cyclic group(s).

More preferably, both the one or more saturated polyesters (A) and the one or more unsaturated polyesters (B) each comprise one or more aliphatic cyclic group(s) in the polyester backbone, even more preferably, both the one or more saturated polyesters (A) and the one or more unsaturated polyesters (B) each comprise between 10 and 70% by weight, still even more preferably between 15 and 65% by weight, or even between 20 and 60% by weight, most preferably between 25 and 60% by weight of one or more aliphatic cyclic group(s).

By aliphatic cyclic groups the present invention means aliphatic monocyclic or aliphatic polycyclic groups.

By aliphatic monocyclic groups the present invention means a C4 to C6 cyclic group, optionally alkyl substituted and/or optionally comprising one or more heteroatom(s) (for example wherein in said C4 to C6 cyclic group one or more hydrocarbon(s) (—CH$_2$—) is (are) replaced by an hetero atom and/or wherein said C4 to C6 cyclic group has a hetero-atom comprising substituent).

The aliphatic monocyclic groups preferably are incorporated in the polyester backbone through esterification of aliphatic monocyclic diols, such as 1,4-cyclohexanedimethanol, 2,2,4,4-tetramethyl-1,3-butanediol and/or 1,4-cyclohexanediol, and/or monocyclic dicarboxylic acids and/or anhydrides, such as, 2-cyclohexanedicarboxylic acid or its anhydride, 1,3-cyclohexanedicarboxylic acid, 1,4-cyclohexane dicarboxylic acid, preferably in the presence of polyols and polycarboxylic acids.

Preferably the aliphatic polycyclic groups are aliphatic bicyclic groups and/or aliphatic tricyclic groups, more preferably aliphatic tricyclic groups.

Preferably the aliphatic polycyclic groups do not comprise ethylenically unsaturated double bonds in the polycyclic ring structure.

The aliphatic tricyclic diols preferably are selected from the group consisting of 3,8-bis(hydroxymethyl)-tricyclo[5.2.1.0$^{2,6}$]decane, 4,8-bis(hydroxymethyl)-tricyclo[5.2.1.0$^{2,6}$]decane, 5,8-bis-(hydroxymethyl)-tricyclo[5.2.1.0$^{2,6}$]decane, and mixtures thereof (the mixtures thereof being referred to as TCD-diol).

Preferably the aliphatic tricyclic diols comprise at least one aliphatic tricyclic compound, more preferably the aliphatic tricyclic diols comprise a mixture of at least two aliphatic tricyclic compounds.

The aliphatic bicyclic diols preferably are aliphatic hetero-bicyclic diols selected from the group consisting of isosorbide, isomannide, isoidide, and derivatives thereof.

In the present description, by the wording "aliphatic hetero-bicyclic diols" it is referred to aliphatic bicyclic diols having a bicyclic aliphatic ring, wherein said ring comprises at least one hetero atom, i.e. wherein in said ring one or more hydrocarbon(s) (—CH$_2$—) is (are) replaced by an hetero atom (such as for example oxygen).

Preferably the aliphatic bicyclic diols comprise at least one aliphatic bicyclic diol, more preferably the aliphatic bicyclic diols comprise a mixture of at least two aliphatic bicyclic diols.

The aliphatic polycyclic groups preferably are incorporated in the polyester backbone through esterification of aliphatic polycyclic diols with polycarboxylic acids and/or anhydrides and polyols.

Optionally the aliphatic polycyclic groups are incorporated in the polyester backbone through esterification of a mixture comprising one or more aliphatic bicyclic diol(s) and one or more aliphatic tricyclic diol(s) with polycarboxylic acids and/or anhydrides and polyols.

Preferably, the one or more saturated polyesters (A) is (are) the reaction product of an acid constituent comprising from 50 to 100 mole percentage, preferably from 60 to 100 mole percentage, more preferably from 70 to 100 mole percentage, most preferably from 80 to 100 mole percentage of an aromatic dicarboxylic acid selected from the group consisting of terephthalic acid, isophthalic acid and mixtures thereof, and from 0 to 50 mole percentage, preferably from 0 to 40 mole percentage, more preferably from 0 to 30 mole percentage, most preferably from 0 to 20 mole percentage of one or more saturated aliphatic, saturated cycloaliphatic or aromatic diacid(s) or their anhydride, and a glycol constituent, comprising from 5 to 30 mole percentage, preferably from 10 to 25 mole percentage of one or more aliphatic and/or cycloaliphatic diol(s), and from 70 to 95 mole percentage, preferably from 75 to 90 mole percentage of one or more aliphatic polycyclic diol(s), the one or more saturated polyesters (A) having a Weight Average Molecular Weight of at least 15,000 g/mol, as measured by Gel Permeation Chromatograph using tetrahydrofuran as solvent, and a glass transition temperature, as measured by Differential Scanning Calorimetry, according to DIN EN 61006, method A, of at least 60° C.

More preferably, the one or more saturated polyesters (A) are the reaction product of
- an acid constituent comprising from 50 to 100 mole percentage, preferably from 60 to 100 mole percentage, more preferably from 70 to 100 mole percentage, most preferably from 80 to 100 mole percentage of an aromatic dicarboxylic acid selected from the group consisting of terephthalic acid, isophthalic acid and mixtures thereof, and from 0 to 50 mole percentage, preferably from 0 to 40 mole percentage, more preferably from 0 to 30 mole percentage, most preferably from 0 to 20 mole percentage of one or more saturated aliphatic, saturated cycloaliphatic or aromatic diacid(s) or their anhydride, and
- a glycol constituent, comprising from 5 to 30 mole percentage, preferably from 10 to 25 mole percentage of one or more aliphatic and/or cycloaliphatic diol(s), and from 70 to 95 mole percentage, preferably from 75 to 90 mole percentage of one or more aliphatic polycyclic diol(s);

wherein:
- the saturated aliphatic diacid is selected from the group consisting of succinic acid, glutaric acid, adipic acid, pimelic acid, suberic acid, azelaic acid, sebacic acid, and mixtures thereof;
- the saturated cycloaliphatic diacid is selected from the group consisting of 1,2-cyclohexanedicarboxylic acid or its anhydride, 1,3-cyclohexanedicarboxylic acid, 1,4-cyclohexane dicarboxylic acid and mixtures thereof;
- the aromatic diacids are selected from the group consisting of phthalic acid, 2,6-naphthalene dicarboxylic acid, 2,7-naphthalene dicarboxylic acid and mixtures thereof;

and wherein:
- the aliphatic diol is selected from the group consisting of ethylene glycol, 1,3-propanediol, 1,4-butanediol, 1,6-hexanediol, 2-ethyl-2-butyl-1,3-propanediol, 2-methyl-1,3-propanediol, neopentyl glycol, neopentyl glycol hydroxypivalate and mixtures thereof;
- the cycloaliphatic diol is selected from the group consisting of 1,4-cyclohexanedimethanol, 2,2,4,4-tetramethyl-1,3-butanediol, 1,4-cyclohexanediol, and mixtures thereof.

Even more preferably, the one or more saturated polyesters (A) is (are) the reaction product of terephthalic acid as the dicarboxylic acid component, 1,4-butanediol as the aliphatic diol component and a mixture of 3,8-bis(hydroxymethyl)-tricyclo[5.2.1.0$^{2,6}$]decane, 4,8-bis(hydroxymethyl)-tricyclo[5.2.1.0$^{2,6}$]decane, and 5,8-bis-(hydroxymethyl)-tricyclo[5.2.1.0$^{2,6}$]decane as the aliphatic polycyclic diol component.

Preferably, the one or more unsaturated polyesters (B) are the reaction product of
- an acid constituent comprising from 50 to 90 mole percentage, preferably from 60 to 85 mole percentage of an aromatic dicarboxylic acid selected from the group consisting of terephthalic acid, isophthalic acid and mixtures thereof; from 10 to 50 mole percentage, preferably from 15 to 40 mole percentage of one or more unsaturated diacid(s) or the anhydride thereof; and from 0 to 30 mole percentage, preferably from 0 to 20 mole percentage of one or more saturated aliphatic, saturated cycloaliphatic or aromatic diacid(s) or their anhydride, and
- a glycol constituent comprising from 5 to 30 mole percentage, preferably from 10 to 25 mole percentage of one or more aliphatic and/or cycloaliphatic diol(s), and from 70 to 95 mole percentage, preferably from 75 to 90 mole percentage of one or more aliphatic polycyclic diol(s), the one or more unsaturated polyesters (B) having a Weight Average Molecular Weight of at least 15,000 g/mol, as measured by Gel Permeation Chromatograph using tetrahydrofuran as solvent, and a glass transition temperature, as measured by Differential Scanning Calorimetry, according to DIN EN 61006, method A, of at least 60° C., and an unsaturated equivalent weight comprised between 300 and 6,000 g/equiv.

More preferably, the one or more unsaturated polyesters (B) are the reaction product of
- an acid constituent comprising from 50 to 90 mole percentage, preferably from 60 to 85 mole percentage of an aromatic dicarboxylic acid selected from the group consisting of terephthalic acid, isophthalic acid and mixtures thereof; from 10 to 50 mole percentage, preferably from 15 to 40 mole percentage of one or more unsaturated diacid(s) or the anhydride thereof; and from 0 to 30 mole percentage, preferably from 0 to 20 mole percentage of one or more saturated aliphatic, saturated cycloaliphatic or aromatic diacid(s) or their anhydride, and
- a glycol constituent comprising from 5 to 30 mole percentage, preferably from 10 to 25 mole percentage of one or more aliphatic and/or cycloaliphatic diol(s), and from 70 to 95 mole percentage, preferably from 75 to 90 mole percentage of one or more aliphatic polycyclic diol(s);

wherein:
- the saturated aliphatic diacid is selected from the group consisting of succinic acid, glutaric acid, adipic acid, pimelic acid, suberic acid, azelaic acid, sebacic acid, and mixtures thereof;
- the saturated cycloaliphatic diacid is selected from the group consisting of 1,2-cyclohexanedicarboxylic acid or its anhydride, 1,3-cyclohexanedicarboxylic acid, 1,4-cyclohexane dicarboxylic acid and mixtures thereof;
- the aromatic diacids are selected from the group consisting of phthalic acid, 2,6-naphthalene dicarboxylic acid, 2,7-naphthalene dicarboxylic acid and mixtures thereof;
- the unsaturated diacid(s) or anhydride(s) are selected from the group consisting of maleic acid, fumaric acid, itaconic acid, mesaconic acid, citraconic acid, tetrahydrophthalic acid, 5-norbornene-2,3-dicarboxylic acid (also referred to as nadic acid), methylnadic acid, or their anhydrides, and mixtures thereof;

and wherein:
- the aliphatic diol is selected from the group consisting of ethylene glycol, 1,3-propanediol, 1,4-butanediol, 1,6-hexanediol, 2-ethyl-2-butyl-1,3-propanediol, 2-methyl-1,3-propanediol, neopentyl glycol, neopentyl glycol hydroxypivalate and mixtures thereof;

the cycloaliphatic diol is selected from the group consisting of 1,4-cyclohexanedimethanol, 2,2,4,4-tetramethyl-1,3-butanediol, 1,4-cyclohexanediol, and mixtures thereof.

Even more preferably, the one or more unsaturated polyesters (B) is (are) the reaction product of terephthalic acid as the dicarboxylic acid component, maleic anhydride and/or fumaric acid as the unsaturated dicarboxylic acid component, 1,4-butanediol as the aliphatic diol component, and a blend (mixture) of 3,8-bis(hydroxymethyl)-tricyclo[5.2.1.0$^{2,6}$]decane, 4,8-bis(hydroxymethyl)-tricyclo[5.2.1.0$^{2,6}$]decane, and 5,8-bis-(hydroxymethyl)-tricyclo[5.2.1.0$^{2,6}$]decane as the aliphatic polycyclic diol component.

Optionally, terephthalic acid and/or isophthalic acid of one or more polyesters (A) and/or one or more polyesters (B) can be totally or partially replaced by 2,5-furandicarboxylic acid, wherein partially replacement should be understood as a replacement of from 5 to 95 mole percentage of terephthalic acid and/or isophthalic acid by from 95 to 5 mole percentage of 2,5-furandicarboxylic acid.

Both the one or more polyesters (A) and the one or more unsaturated polyesters (B) have a Weight Average Molecular Weight (Mw) of at least 15,000 g/mole, as measured by Gel Permeation Chromatograph using tetrahydrofuran as solvent and, preferably, a polydispersity (DPI=Mw/Mn) of at least 2.

Preferably, both the one or more polyesters (A) and the one or more unsaturated polyesters (B) have a Weight Average Molecular Weight (Mw) comprised between 15,000 and 50,000 g/mole, more preferably between 20,000 and 50,000 g/mole, even more preferably between 20,000 and 45,000 g/mole, still even more preferably between 25,0000 and 45,000 g/mole, still even more preferably between 25,000 and 40,000 g/mole, most preferably between 25,000 and 35,000 g/mole, and, preferably, a polydispersity (DPI=Mw/Mn) comprised between 2 and 6, more preferably between 2 and 5.5, even more preferably between 2 and 5.3.

Both the one or more polyesters (A) and the one or more unsaturated polyesters (B) have a glass transition temperature, as measured by Differential Scanning Calorimetry, according to DIN EN 61006, method A, of at least 60° C., preferably at least 70° C., more preferably between 80 and 130° C., even more preferably between 90 and 120° C., most preferably between 95 and 120° C., wherein either each of the one or more (A) and the one or more (B) answer said glass transition temperature ranges or wherein the blend of one or more (A) and one or more (B) answer said glass transition temperature ranges.

Preferably, the one or more saturated polyesters (A) and the one or more unsaturated polyesters (B) have an intrinsic viscosity in chloroform, according to DIN 51562 T1, comprised between 10 and 50 ml/g, preferably between 15 and 45 ml/g, more preferably between 20 and 40 ml/g; wherein either each of the one or more (A) and the one or more (B) has said intrinsic viscosity ranges, or wherein the blend of the one or more (A) and one or more (B) has said intrinsic viscosity ranges.

The one or more unsaturated polyester(s) (B) further has (have) an unsaturated equivalent weight comprised between 300 and 6,000 g/equiv., preferably between 500 and 4,000 g/equiv., more preferably between 500 and 2,000 g/equiv., most preferably between 700 and 1,600 g/equiv.

The one or more saturated polyesters (A) and/or the one or more unsaturated polyesters (B) are prepared in a single or multistep condensation process comprising:
  adding the one or more dicarboxylic acid(s) to a 5 to 15% stoichiometric excess of one or more diol(s), and
  reacting, in the presence of an azeotropic hydrocarbon solvent and an esterification catalyst, under nitrogen purge at a temperature comprised of at least 170° C. up to 250° C., using reflux distillation, until an acid value of less than 5 mg KOH/g is obtained.

Preferably the one or more polyesters (A) are prepared in a single step process, wherein a stoichiometric excess of one or more diols, one or more diacids, together with an azeotropic hydrocarbon solvent and an esterification catalyst are reacted at a temperature comprised between 225 and 250° C. until an acid value of less than 5 mg KOH, preferably less than 4 mg KOH/g, more preferably less than 3 mg KOH/g. Optionally, for the particular case where the intended molecular weight is not obtained, small amount of saturated aliphatic acid and/or aromatic dicarboxylic acids and/or their anhydride are added whereupon condensation is continued till an acid number of less than 5 mg KOH/g, preferably less than 4 mg KOH/g, more preferably less than 3 mg KOH/g.

Preferably the one or more unsaturated polyesters (B) is (are) prepared in a two-step process, wherein a stoichiometric excess of one or more diols, one or more diacids, together with an azeotropic hydrocarbon solvent and an esterification catalyst are reacted at a temperature comprised between 225 and 250° C. until an acid value of less than 5 mg KOH, preferably less than 4 mg KOH/g, more preferably less than 3 mg KOH/g. Subsequently the reaction mixture is cooled down to a temperature comprised between 170 and 190° C. whereupon one or more alpha, beta-unsaturated dicarboxylic acid(s), or their anhydride, and/or one or more dicarboxylic acids comprising an isolated ethylenically unsaturated double bond, or their anhydride, are added, whereupon condensation is continued at a temperature comprised between 170 and 190° C. until an acid number of less than 5 mg KOH/g, preferably less than 4 mg KOH/g, more preferably less than 3 mg KOH/g is obtained.

Examples of an esterification catalyst which is used are tin derivatives, such as dibutyltin dilaurate, dibutyltin oxide, monobutyltin oxide or n-butyltin trioctanoate, or titanium derivatives, such as tetrabutoxytitanium (also referred to as tetrabutyltitanate, butyltitanate, or titanium butoxide). Preferred catalysts for the polyester preparation of the present invention are tin derivatives.

From 0 to 1% of phenolic derivatives, such as IRGANOX®1010 (BASF), alone or in a mixture with various stabilizers, such as those of the phosphite type, such as trialkyl phosphite (WESTON™), may be added to the esterification mixture at any step of the reaction, i.e. at the beginning, during or at the end of the polyesterification.

The one or more saturated polyesters (A) and the one or more unsaturated polyesters (B) preferably are diluted with appropriate solvents to obtain the intended viscosity for liquid coating application.

Suitable organic solvents include aliphatic hydrocarbons (e.g. mineral spirits, kerosene, high flashpoint VM&P naphtha, and the like); aromatic hydrocarbons (e.g. toluene, xylene, solvent naphtha 100, 150, 200 and the like); alcohols (e.g. ethanol, n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol); glycol ethers (e.g. ethylene glycol monomethyl ether, ethylene glycol monoethyl ether, ethylene glycol monobutyl ether, propylene glycol monomethyl ether, methoxypropanol and the like); glycol esters (e.g. butyl glycol acetate, methoxypropyl acetate and the like); and mixtures thereof.

Preferred organic solvents include aliphatic hydrocarbons, aromatic hydrocarbons, glycol esters, and mixtures thereof.

To the mixture comprising one or more saturated polyesters (A) and one or more unsaturated polyesters (B), one or more additives are added selected from the group consisting of carriers, additional polymers, emulsifiers, pigments, metal powders or paste, fillers, anti-migration aids, anti-microbials, extenders, lubricants, coalescents, wetting agents, biocides, plasticizers, crosslinkers, crosslinking catalysts, antifoaming agents, colorants, waxes, anti-oxidants, anticorrosion agents, flow control agents, thixotropic agents, dispersants, adhesion promoters, UV stabilizers and scavenger agents, in order to obtain the coating formulation.

Optionally the coating formulation of the present invention comprises one or more additional crosslinkers. Any suitable crosslinker or combination of crosslinkers can be used. For example, phenolic crosslinkers (e.g., phenoplasts), amino crosslinkers (e.g., aminoplasts), blocked isocyanate crosslinkers, epoxy-functional crosslinkers, and combinations thereof, may be used. Preferred crosslinkers are at least substantially free, more preferably completely free, of bound bisphenol A and aromatic glycidyl ethers.

When additional crosslinkers are used in the coating formulation of the present invention, phenolic crosslinkers are preferably used.

Examples of suitable phenolic crosslinkers include the reaction products of aldehydes with phenols. Formaldehyde and acetaldehyde are preferred aldehydes. Non-limiting examples of suitable phenols that can be employed include phenol, cresol, p-phenylphenol, p-tert-butylphenol, p-tert-amylphenol, cyclopentylphenol, cresylic acid and combinations thereof.

When present, the concentration of one or more optional crosslinkers in the coating formulation may vary depending upon the desired result. For example, in some embodiments, the coating composition may comprise from 0.01 to 50% by weight preferably from 5 to 50% by weight, more preferably from 10 to 40% by weight, most preferably from 15 to 30% by weight of one or more crosslinkers, based on the total weight of one or more saturated polyesters (A), one or more unsaturated polyesters (B) and one or more crosslinkers.

For the particular optional case where additional crosslinkers are used, the coating composition preferably comprises:
 between 35 and 50% by weight of a mixture comprising
  between 50 and 95% by weight of one or more saturated polyesters (A) and one or more unsaturated polyesters (B), and
  between 5 and 50% by weight of one or more crosslinker(s), and
 between 50 and 65% by weight of one or more organic solvent(s).

Preferably, the use of additional crosslinkers is completely omitted (i.e. the coating formulation of the present invention comprises 0.0% crosslinker).

Optionally a crosslinking catalyst is added.

Suitable crosslinking catalysts are peroxides, hydroperoxides, peresters, metal catalysts, strong acids, tertiary and quaternary ammonium compounds, phosphorous compounds, sulfur containing compounds, and combinations thereof. More particularly, optionally a metal catalyst is added.

Suitable metal catalysts are selected from the group consisting of aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn) and zirconium (Zr), and salts or complexes thereof, preferably, suitable metal catalysts are titanium, iron or manganese, more preferably, iron or manganese (or salts or complexes thereof). In the present description, the wording "metal catalyst" refers to "metal crosslinking catalyst".

If used, a crosslinking catalyst is preferably present in an amount comprised between 0.01 and 3% by weight, more preferably in an amount comprised between 0.1 and 1.0% by weight based on the weight of nonvolatile material in the coating composition.

More preferably, in the coating formulation of the present invention the addition of crosslinking catalysts is completely omitted (i.e. the coating formulation of the present invention comprises 0.0% crosslinking catalysts).

According to one embodiment, where the one or more unsaturated polyester(s) comprise(s) alpha, beta-unsaturated ester moieties, preferably obtained from the esterification of maleic anhydride and/or fumaric acid, the quantity of metal catalyst is low, preferably less than 0.1% by weight, more preferably less than 0.001% by weight based on the weight of nonvolatile material in the coating composition. Most preferably no metal catalyst is added (i.e. the coating formulation of the present invention comprising 0.0% metal catalyst).

Furthermore, organometallic and/or organometalloid compounds may be added to the coating composition as an adhesion promotor, in an amount of up to 1.5% by weight, preferably of up to 1.2% by weight, more preferably of up to 0.9% by weight, based on the weight of nonvolatile material in the coating composition.

Suitable adhesion promoting compounds are selected from the group consisting of titanates, zirconates, silanes, and mixtures thereof.

Preferably the titanates are selected from the group consisting of tetraalkyltitanates; more preferably the tetraalkyltitanate is tetrabutyltitanate.

Preferably the zirconates are selected from the group consisting of tetraalkylzirconates; more preferably the tetraalkylzirconate is tetrabutylzirconate.

Preferably the silanes are selected from the group consisting of functionalized di- or trialkoxysilanes; more preferably the functionalized di- or trialkoxysilane is di- or trimethoxysilane comprising an acrylate, amino or epoxy functional group, such as for example methacryloxypropylmethyl dimethoxysilane, aminopropyltrimethoxysilane, (2-aminoethyl)-3-aminopropyl-trimethoxysilane, 3-glycidoxypropyltrimethoxysilane.

Preferably the coating composition comprises at least 0.05% by weight more preferably at least 0.1% by weight, of adhesion promotor, based on the weight of nonvolatile material in the coating composition. More preferably, the coating composition comprises between 0.05% and 1.5% by weight, even more preferably between 0.1% and 1.5% by weight, most preferably between 0.1% and 1.2% by weight of an adhesion promotor, based on the weight of nonvolatile material in the coating composition.

Preferably, the coating composition comprises between 0.05% and 1.5% by weight, even more preferably between 0.1% and 1.5% by weight, most preferably between 0.1% and 1.2% by weight of tetraalkyltitanate; more preferably tetrabutyltitanate, based on the weight of nonvolatile material in the coating composition.

According to another embodiment, where the one or more unsaturated polyester(s) comprise(s) an isolated ethylenically unsaturated double bond, preferably obtained from the esterification of unsaturated diacids or the anhydride thereof comprising an isolated ethylenically unsaturated double bond such as tetrahydrophthalic acid, nadic acid, or methylnadic acid, or the anhydride thereof, preferably metal catalyst is present, more preferably iron or manganese (or salts or complexes thereof), in an amount of at least 0.01%, more preferably between 0.01 and 3% by weight, most preferably in an amount comprised between 0.1 and 1.0% by weight based on the weight of nonvolatile material in the coating composition.

Preferably, the coating composition of the present invention comprises less than 10,000 ppm, more preferably less than 5,000 ppm, even more preferably less than 1,000 ppm, even more preferably less than 500 ppm, still even more preferably less than 100 ppm, or even less than 50 ppm, most preferably less than 20 ppm of constituents selected from the group consisting of Bisphenol-A (NI) (i.e. Bisphenol-A Non Intent), formaldehyde, and isocyanates, and mixtures thereof.

The coating composition of the invention can be applied to a substrate using any suitable procedure such as spray coating, roll coating, coil coating, curtain coating, immersion coating, dip coating, electrostatic deposition coating and the like, as well as other types of premetered coating. In one embodiment, where the coating is used to coat metal sheets or coils, the coating can be applied by roll coating.

In the present invention, the term "can" refers to various kind of cans, such as two-part cans, three-part cans, or monoblock cans.

The coating composition of the present invention can be applied to a wide variety of substrates, selected from the group consisting of metal, glass, polymers (such as polyimide-amide, polyetherketone, polyethersulfone polyphenylsulfone or polybenzimidazole), composites, concrete, ceramics and engineered wood (such as medium density fiber board or high density fiber board, particle board or oriented strand board), provided said substrates resist to the stoving cycle conditions.

The coating composition of the present invention can be applied on at least one side of the substrate, preferably on two sides of the substrate.

Preferably, the substrate is a metal substrate, more preferably a tinplate, a tin-free steel or an aluminium substrate.

Preferably, the coating formulations are applied at such a thickness, that the resulting coating, after curing, has a dry film thickness of less than 60 μm, preferably of less than 30 μm, more preferably comprised between 3 and 20 μm, even more preferably between 5 and 15 μm, most preferably between 8 and 12 μm.

Solvent evaporation and curing of the coating may be performed in an air ventilated convection oven at a temperature of at least 150° C., preferably comprised between 150 to 250° C., more preferably between 170 and 230° C., even more preferably between 180 and 220° C., most preferably between 190 and 210° C., for a period of at least 20 seconds, preferably of from 1 to 25 minutes, more preferably of from 2 to 22 minutes, even more preferably of from 5 to 20 minutes, still even more preferably of from 8 to 18 minutes, most preferably from 10 to 15 minutes.

Alternatively the coating may be cured by InfraRed irradiation, such as near, short or medium infrared, or by induction or by a combination thereof. In the embodiment where infrared or induction systems are used, the stoving cycle is within the range comprised between 2 and 160 seconds, depending on the heating system or the combination of heating systems.

Finding a suitable combination of stoving temperature and time is well within the practice of those skilled in the art.

The coating formulations according to the present invention preferably are used in coil coating applications comprising the steps of
- unwinding a coil of a metal substrate
- applying the coating formulation of the present invention on at least one side of the unwound metal substrate, at an appropriate coating thickness;
- stoving the applied coating formulation by means of suitable heating systems to form the metal substrate coated with the cross-linked coating layer; and
- rewinding the metal substrate to form a metal substrate coil comprising the cross-linked coating layer.

Prior to the coating application, the metal substrate preferably is pre-treated and/or primered. In an embodiment, the coil of the metal substrate, as provided by the supplier, is pre-treated and/or primered.

The coating formulations according to the present invention preferably are used in (light) metal packaging, more particularly in can coating applications comprising the steps of:
- unwinding the coated metal substrate coil, coated with the cured coating formulation of the present invention;
- cutting a can body and can ends into the desired shape, in order to produce a three-piece can; or
- embossing a metal piece into a can body and cutting the can end into the desired shape in order to produce a two-piece can;
- assembling the can body and the can end(s).

Preferably the exterior surface of the cans comprise one or more prints.

Preferably the cans are intended for food and beverage applications.

When used in coil or can coating applications, the interior and/or the exterior of the coils or cans can be coated with the coating composition of the present invention.

Preferably the interior and the exterior of the coils or cans are coated with the coating composition of the present invention.

Using the coating compositions of the present invention, coatings are obtained having good coating performance, more particularly having improved solvent resistance (compared to when using coating compositions already described in the prior art up to now), without losing their flexibility. Indeed, using the coating compositions of the present invention, the obtained coatings have good sterilization resistance, flexibility and substrate adhesion after sterilization, more specifically when the coating composition of the present invention is applied to metal substrates such as coils and cans. Moreover, preferred coating compositions of the present invention do not comprise an additional crosslinker nor a crosslinking catalyst, and are BPA-NI (Bisphenol A-non intent, also denoted throughout the present description as Bisphenol-A (NI) or Bisphenol-A non intent) and formaldehyde free.

EXAMPLES

The following illustrative examples are merely meant to exemplify the present invention but are not intended to limit or otherwise define the scope of the present invention.

Example 1: Synthesis of a Saturated Polyester (A)

A 1 liter 4-necked round-bottomed flask fitted with a stirrer, a reflux cooler with water separator, a nitrogen inlet and a thermosensor was charged with 353 g of a mixture of the isomeric compounds of 3,8-bis(hydroxymethyl)-tricyclo [5.2.1.0$^{2,6}$]decane, 4,8-bis(hydroxymethyl)-tricyclo [5.2.1.0$^{2,6}$]decane and 5,8-bis-(hydroxymethyl)-tricyclo [5.2.1.0$^{2,6}$]decane (the mixture being referred to as TCD-diol), 27 g of 1,4-butanediol, 332 g of terephthalic acid, 22 g of Solvent Nafta 150/180 and 0.6 g of monobutyltin oxide under nitrogen purge.

The mixture was heated under a continuous nitrogen flow, under stirring, within 90 minutes to 180° C. The temperature was kept at 180° C. for 30 minutes. Subsequently the temperature was increased to 240° C. at a heating rate of 10° C./h. and reflux distillation was set up by the addition of Solvent Nafta 150/180, while reaction water continued to separate.

Reflux distillation was maintained for about 3 hours until a water distillate of 70 g was collected and a Dynamic Viscosity, at 23° C., for sample diluted to 40% of solids with Solvent Nafta150/180, comprised between 900 and 1,000 mPa·s was measured. The temperature was then reduced to 180° C. and reflux distillation was adjusted again by addition of Nafta 150/180 in small portions.

Reflux distillation was allowed to continue for about 6 hours until a water distillate of 3.5 g was collected and an acid value of less than 4 mg KOH/g and a Dynamic Viscosity, at 23° C., for sample diluted to 40% of solids with Solvent Nafta150/180, comprised between 3200 and 3800 mPa·s were measured.

The reaction mixture was cooled down to 145° C. and diluted with Solvent Nafta 150/180 in small portions under good stirring, aiming at a target Dynamic Viscosity, at 23° C., of less than 5000 mPa·s.

The saturated polyester was characterized by a non-volatile matter content, according to DIN 55671 (foil method), 180° C., 10 min., of 39.9%; an acid value according to DIN EN ISO 2114 of 1.5 mg KOH/g; a dynamic viscosity, according to DIN EN ISO 3219, at 23° C. and a shear rate of 10.1/s of 4,610 mPa·s (Anton Paar, Physica MCR1), a number average molecular weight and a weight average molecular weight, as measured by Gel Permeation Chromatography in tetrahydrofuran of respectively 8,826 g/mole and 34,260 g/mole; a glass transition temperature, as measured by Differential Scanning Calorimetry, according to DIN EN 61006 (method A) of 109° C.

Example 2: Synthesis of an Unsaturated Polyester (B)

A 1 liter 4-necked round-bottomed flask fitted with a stirrer, a reflux cooler with water separator, a nitrogen inlet and a thermosensor was charged with 353 g of a mixture of the isomeric compounds of 3,8-bis(hydroxymethyl)-tricyclo [5.2.1.0$^{2,6}$]decane, 4,8-bis(hydroxymethyl)-tricyclo [5.2.1.0$^{2,6}$]decane and 5,8-bis-(hydroxymethyl)-tricyclo [5.2.1.0$^{2,6}$]decane (TCD-diol), 27 g of 1,4-butanediol, 266 g of terephthalic acid, 18 g of Solvent Nafta 150/180 and 0.6 g of monobutyltin oxide under nitrogen purge.

The mixture was heated under a continuous nitrogen flow, under stirring, within 90 minutes to 180° C. The temperature was kept at 180° C. for 30 minutes. Subsequently the temperature was increased to 240° C. at a heating rate of 10° C./h. and reflux distillation was set up by the addition of Solvent Nafta 150/180, while reaction water continued to separate.

Reflux distillation was allowed to continue for about 5 hours until a water distillate of 58 g was collected and an acid value of less than 4 mg KOH/g was measured.

The reaction mixture was cooled down to 170° C. and 39 g of maleic anhydride and 0.7 g of butylhydroxytoluene were added under stirring.

The temperature was increased to 180° C. and reflux distillation was set up again by further addition of Solvent Nafta 150/180. Reflux distillation was allowed to continue for about 8 hours until a water distillate of 8 g was collected and an acid value of less than 4 mg KOH/g was measured. The reaction mixture was cooled to 145° C. and diluted with Solvent Nafta 150/180 in small portions under good stirring, aiming at a target dynamic viscosity, at 23° C., of less than 5,000 mPa·s.

The unsaturated polyester was characterized by a non-volatile matter content, according to DIN 55671 (foil method), 180° C., 10 min., of 44.7%; an acid value according to DIN EN ISO 2114 of 3.4 mg KOH/g; a dynamic viscosity, according to DIN EN ISO 3219, at 23° C. and a shear rate of 10.1/s of 4,702 mPa·s; an intrinsic viscosity, according to DIN 51562 T1-3 with chloroform as solvent, of 31.9 ml/g; a number average molecular weight and a weight average molecular weight, as measured by Gel Permeation Chromatography in tetrahydrofuran of respectively 7,792 g/mole and 34,080 g/mole; a glass transition temperature, as measured by Differential Scanning Calorimetry, according to DIN EN 61006 (method A) of 105° C. and an unsaturated equivalent weight of 1,547 g/equiv.

In the Examples 2 to 6, the unsaturated equivalent weight is calculated by dividing the weight of the polyester by the number of moles of ethylenically unsaturated diacids present in the initial reaction mixture, the weight of the polyester being the sum of the weight of polyols, polyacids and ethylenically unsaturated diacids, minus the weight of the water formed during the polycondensation.

Examples 3 to 5: Synthesis of Unsaturated Polyesters (B)

Unsaturated polyesters (B) of the Examples 3, 4 and 5 (table 1) were prepared according to the method of Example 2.

In Example 3, tetrahydrophthalic anhydride was thereby used instead of maleic anhydride (as indicated accordingly in table 1) for further preparing and evaluating a coating formulation in the absence of the saturated polyester (A) of Example 1, as one of the comparative examples shown in table 8 further below.

Example 4a in table 1 corresponds to the synthesis of an unsaturated polyester (B) with an alternative esterification catalyst (i.e. using tetrabutyltitanate as esterification catalyst in Ex. 4a versus monobutyltin oxide used as esterification catalyst in Ex. 3, Ex. 4 and Ex. 5), and is prepared as follows:

A 1 liter 4-necked round-bottomed flask fitted with a stirrer, a reflux cooler with water separator, a nitrogen inlet and a thermosensor was charged with 353 g of a mixture of the isomeric compounds of 3,8-bis(hydroxymethyl)-tricyclo [5.2.1.0$^{2,6}$]decane, 4,8-bis(hydroxymethyl)-tricyclo [5.2.1.0$^{2,6}$]decane and 5,8-bis(hydroxymethyl)-tricyclo [5.2.1.0$^{2,6}$]decane (TCD-diol), 27 g of 1,4-butanediol, 232 g of terephthalic acid, 18 g of Solvent Naphta 150/180 and 2.4 g of tetrabutyltitanate under nitrogen purge.

The mixture was heated under a continuous nitrogen flow, under stirring, within a time period of 90 minutes, to 180° C. The temperature was kept at 180° C. for 30 minutes. Subsequently the temperature was increased to 240° C. at a heating rate of 10° C./h and reflux distillation was set up by the addition of Solvent Naphta 150/180, while reaction water continued to separate.

Reflux distillation was allowed to continue for about 5 hours until a water distillate of 50 g was collected and an acid value of less than 4 mg KOH/g was measured.

The reaction mixture was cooled down to 140° C. and 59 g of maleic anhydride and 0.7 g of butylhydroxytoluene were added under stirring.

The temperature was increased to 175° C. and reflux distillation was set up again by further addition of Solvent Naphta 150/180. Reflux distillation was allowed to continue for 8 hours until a water distillate of 11 g was collected and an acid value of less than 4 mg KOH/g was measured. The reaction mixture was cooled to 145° C. and diluted with Solvent Naphta 150/180 in small portions under good stirring, aiming at a target dynamic viscosity, at 23° C., of less than 5,000 mPa·s.

The unsaturated polyester was characterized by a non-volatile matter content, according to DIN 55671 (foil method), 180° C., 10 min., of 44.7%; an acid value, according to DIN EN ISO 2114, of 2.7 mg KOH/g; a dynamic viscosity, according to DIN EN ISO 3219, at 23° C. and a shear rate of 10.1/s, of 2,509 mPa·s; an intrinsic viscosity, according to DIN 51562 T1-3 with chloroform as solvent, of 28.9 ml/g; a number average molecular weight and a weight average molecular weight, as measured by Gel Permeation Chromatography in tetrahydrofuran of respectively 7,066 g/mole and 28,550 g/mole; a glass transition temperature, as measured by Differential Scanning Calorimetry, according to DIN EN 61006 (method A) of 105° C. and an unsaturated equivalent weight of 1,017 g/equiv.

Example 6: Synthesis of an Unsaturated Polyester (B)

Unsaturated polyester (B) of Example 6 in table 1 is prepared as follows:

A 1 liter 4-necked round-bottomed flask fitted with a stirrer, a reflux cooler with water separator, a nitrogen inlet and a thermosensor was charged with 176 g of a mixture of the isomeric compounds of 3,8-bis(hydroxymethyl)-tricyclo [5.2.1.0$^{2,6}$]decane, 4,8-bis(hydroxymethyl)-tricyclo [5.2.1.0$^{2,6}$]decane and 5,8-bis(hydroxymethyl)-tricyclo [5.2.1.0$^{2,6}$]decane (TCD-diol), 131 g of isosorbide, 27 g of 1,4-butanediol, 232 g of terephthalic acid, 60 g of Solvent Nafta 150/180 and 0.6 g of monobutyltin oxide under nitrogen purge.

The mixture was heated under a continuous nitrogen flow, under stirring, within a time period of 90 minutes, to 180° C. The temperature was kept at 180° C. for 30 minutes. Subsequently the temperature was increased to 240° C. at a heating rate of 10° C./h and reflux distillation was set up by adjusting the amount of Solvent Nafta 150/180, while reaction water continued to separate.

Reflux distillation was allowed to continue for 1 hour at 240° C., whereby a clear-brown reaction mixture was formed (i.e. no undissolved terephthalic acid being present anymore).

The reaction mixture was allowed to cool down to 170° C., then 59 g of maleic anhydride and 0.7 g of butylhydroxytoluene were added under stirring.

The temperature was increased to 180° C. and reflux distillation was set up again by the addition of Solvent Nafta 150/180. Reflux distillation was allowed to continue for 7 hours at 180° C. and for an additional 10 hours at 200° C., at which in total 61 g of reaction-water was formed and the acid value has dropped to 1.5 mg KOH/g. The reaction mixture was cooled to 120° C. and diluted with methoxy-propylacetate in small portions under good stirring, aiming at a target dynamic viscosity, at 23° C., of less than 5,000 mPa·s.

The unsaturated polyester was characterized by a non-volatile matter content, according to DIN 55671 (foil method), 180° C., 10 min., of 42.0%; an acid value according to DIN EN ISO 2114 of 1.5 mg KOH/g; a dynamic viscosity, according to DIN EN ISO 3219, at 23° C. and a shear rate of 10.1/s of 2,350 mPa·s; an intrinsic viscosity, according to DIN 51562 T1-3 with chloroform as solvent, of 20.2 ml/g; a number average molecular weight and a weight average molecular weight, as measured by Gel Permeation Chromatography in tetrahydrofuran of respectively 2,840 g/mole and 20,360 g/mole; a glass transition temperature, as measured by Differential Scanning Calorimetry, according to DIN EN 61006 (method A) of 96° C. and an unsaturated equivalent weight of 942 g/equiv.

TABLE 1

|  | Ex. 3 | Ex. 4 | Ex. 4a | Ex. 5 | Ex. 6 |
|---|---|---|---|---|---|
| TCD-diol (g) | 353 | 353 | 353 | 353 | 176 |
| Isosorbide (g) |  |  |  |  | 131 |
| 1,4-butanediol (g) | 27 | 27 | 27 | 27 | 27 |
| terephthalic acid (g) | 266 | 232 | 232 | 199 | 232 |
| maleic anhydride (g) |  | 59 | 59 | 78 | 59 |
| tetrahydrophthalic anhydride (g) | 61 |  |  |  |  |
| Monobutyltin oxide | 0.6 | 0.6 |  | 0.6 | 0.6 |
| Tetrabutyltitanate |  |  | 4.8 |  |  |
| total solids (g) | 707.6 | 671.6 | 675.8 | 657.6 | 625.6 |
| reaction water (g) | 65 | 61 | 61 | 57 | 61 |
| non-volatile matter (%) | 46.2 | 43 | 44.7 | 44.8 | 42 |
| acid value (mg KOH/g) | 2.9 | 1.1 | 2.7 | 2.1 | 1.5 |
| dynamic viscosity (mPa · s) | 1,266 | 2,747 | 2,509 | 2,796 | 2350 |
| intrinsic viscosity (ml/g) | 23.2 | 33.2 | 29.3 | 29.3 | 20.2 |
| Mn/Mw | 7,403/30,680 | 7,551/38,970 | 7,066/28,550 | 7,194/30,470 | 2,840/17,360 |
| Tg (° C.) | 95 | 108 | 105 | 108 | 96 |
| unsaturated equivalent weight (g/equiv.) | 1,605 | 1,017 | 1,017 | 750 | 942 |

Example 7: Coating Formulation

Coating formulations were prepared from the unsaturated polyesters (B) of Examples 2, 4, 4a, 5 and 6, in combination with the saturated polyester (A) of Example 1 in ratios between 25:75 and 50:50 (B:A) (calculated on solids) and diluted with Solvent Naphtha 150/180 under stirring to a solid content of 40%; 0.3% of Additol XW 6580 (flow and substrate wetting agent, Allnex) was added and homogenized for some minutes.

For further details on various coating formulations prepared, see Tables 2 to 7, as well as Tables 8 and 9 below.

Example 8: Coating Application and Evaluation

The coating formulations, at 40% solids, were bar-drawn on tin-plated steel panels at a wet film thickness of 40 µm. After a flash-off time of 5 minutes, coated panels were oven dried at 200° C. for 12 min, resulting in dry film thicknesses of 10+/−2 µm.

Tests: Coating Evaluation, of Various Coating Formulations Prepared and Applied on Panels, is Based on the Following Tests.

- Cross Cut Test, according to DIN EN ISO 2409 is used to test the adhesion of dry coats on their substrate by means of a series of cuts through the coating. Two series of parallel cuts cross angled to each other to obtain a pattern of 25 or 100 similar squares. The ruled area is evaluated by using a table chart after a short treatment with a stiff brush, or adhesive tape for hard substrates. Classification is from 0 to 5 wherein 0 corresponds to a situation wherein the edges of the cuts are completely smooth and wherein none of the squares of the lattice is detached.
- Surface, flow, leveling and defects of the coating is visually evaluated and graded in five scales from the best (0) to the worst (5).
- The extent of "cure" or crosslinking is measured as a resistance to acetone. This test is performed as described in ASTM D5402. The number of double-rubs (i.e., the number of back-and-forth motions till the metal substrate becomes visible) is reported. Preferably, the acetone solvent resistance is at least 30 double rubs.
- Impact test is measured according to ASTM 2794; coatings are evaluated at an impact of 32 inch-pound. Damage to the coating may be determined visually or with low power magnification. The organic coating under test is applied to four or more suitable thin metal panels. After the coatings have cured are stored for 1 hour at 20° C.; subsequently a standard weight is dropped from a standard height to deform the coating and the substrate. The indentation is an intrusion (direct impact; on coating side) or an extrusion (reverse impact; on metal side).
- Wedge bend test is performed according to ASTM D3281 using an Erichsen Folded-Impact testing device, Type 471; cone bolt 5 mm diameter. Test wedges are formed from coated rectangular metal test sheets (which measured 10 cm length by 2 cm width). Test wedges are formed from the coated sheets by folding (i.e., bending) the sheets around a 5 mm diameter mandrel. To accomplish this, the mandrel is positioned on the coated sheets so that it is oriented parallel to, and equidistant from, the length edges of the sheets. The resulting test wedges have a 5 mm wedge diameter and a length of 100 mm. To assess the wedge bend properties of the coatings, the test wedges are positioned lengthwise in a metal block of a wedge bend tester and a 1,800+/−g weight is dropped onto the test wedges from a height of 50 cm. The deformed test wedges are then immersed in a an acid copper sulphate test solution for 5 minutes. The solution is prepared by dissolving 132 g of $CuSO_4 \cdot 5H_2O$ in 900 g of water containing 20 g of concentrated hydrochloric acid. The panels are withdrawn from the solution, rinsed with tap water, wiped dry, examined under a microscope and the millimeters of coating failure along the deformation axis of the test wedges measured. The data are expressed as a wedge bend percentage using the following calculation: 100%×[(wedge length 100 mm)−(mm of failure)]/(wedge length 100 mm). The coating is considered to satisfy the Wedge Bend Test if it exhibits a wedge bend percentage of 70% or more.
- Deep drawing test—Erichsen cupping test is performed according to DIN EN 1669, wherein the metal substrate comprising the coating is formed into a cup. In this test the metal substrate is placed on a die surface and drawn into a cup by means of a drawing punch. An asymmetric so called "four corner box" (40×40 mm) with four different angles is formed where the first radius is the largest one and the fourth radius is the smallest. Formation is done by one single drawing step with a drawing force of 10 kN and a sheet holder force of 5 kN. Total height of the box is 25 mm. A visual inspection of the coated surface for defects on the top and the flank is done after the drawing process and the percentage of destruction for the flank is calculated to the total height of 25 mm. "0%" means that no destruction is observed and that the coating on flank is still OK over its whole flank height, whereas the percentage destruction is given by "(Y/25)×100%" wherein Y mm is the height of the flank up to which destruction is observed.
- Blush resistance measures the ability of a coating to resist attack by various solutions. When the film absorbs solution, it generally becomes cloudy or looks white. Blush was measured visually using a scale of 0 to 5 where a rating of "0" indicates no blush, and a rating of "5" indicates severe whitening of the film.

For further details on the preparation of various coating formulations and corresponding evaluation results, see Tables 2 to 9 below.

Examples 9 to 25: Coating Formulations and Evaluation

Coating formulations were prepared comprising 75% by weight of the saturated polyester of Example 1 and 25% by weight of the unsaturated polyester of Example 2 or Example 5 respectively (table 2). The metal catalyst used in Example 9 and Example 11 is OCTA-SOLIGEN® Iron (Borchers GmbH).

TABLE 2

|  | Ex. 9 | Ex. 10 | Ex. 11 | Ex. 12 | Ex. 13 | Ex. 14 |
|---|---|---|---|---|---|---|
| Coating formulation | | | | | | |
| Example 1 | 25 | 25 | 25 | 25 | 25 | 25 |
| Example 2 | 7.23 | 7.23 | | | | |
| Example 5 | | | 7.34 | 7.34 | | |
| Example 6 | | | | | 7.94 | 7.94 |
| Metal catalyst | 0.14 | | 0.14 | | 0.14 | |
| ADDITOL ® XW 6580 | 0.14 | 0.14 | 0.14 | 0.14 | 0.14 | 0.14 |
| Dry film thickness (μm) | 8 | 8 | 12 | 8 | 10 | 9 |
| Coating evaluation | | | | | | |
| Colour cured lacquer | slightly yellowish | clear | slightly yellowish | clear | slightly yellowish | clear |
| Flow | 0 | 0 | 0 | 0 | 0 | 0 |
| Crosscut | 0 | 0 | 0 | 0 | 0 | 0 |
| Acetone double rubs | 69 | 45 | >150 | 98 | 90 | 75 |
| Impact test (dir./rev.) | ok | ok | ok | ok | ok | ok |
| Wedge bend test | 3 | 15 | 57 | 80 | 45 | 70 |
| Deep drawing test | | | | | | |
| Top surface | | | stretchmarks | | | |
| Flank surface | ok | ok | ok | ok | ok | ok |
| First radius (%) | 0 | 0 | 0 | 0 | 0 | 0 |
| Second radius (%) | 0 | 0 | 0 | 0 | 0 | 0 |
| Third radius (%) | 0 | 0 | 0 | 0 | 0 | 0 |
| Fourth radius (%) | 0 | 0 | 39 | 0 | 42 | 25 |

The cured coatings of Examples 9 to 14 were subjected to a 1 hour sterilization at a temperature of 129° C. in deionized water after being subjected to a deep drawing test (table 3).

TABLE 3

Sterilization in deionized water
(1 hr. at 129° C.) after deep drawing test

|  | Ex. 9 | Ex. 10 | Ex. 11 | Ex. 12 | Ex. 13 | Ex. 14 |
|---|---|---|---|---|---|---|
| Top surface | ok | ok | ok | ok | ok | ok |
| Flank surface | ok | ok | ok | ok | ok | ok |
| First radius (%) | 9 | 0 | 64 | 24 | 53 | 44 |
| Second radius (%) | 9 | 0 | 61 | 42 | 64 | 50 |
| Third radius (%) | 24 | 0 | 73 | 49 | 75 | 66 |
| Fourth radius (%) | 46 | 0 | 73 | 58 | 95 | 80 |

The cured coatings of Example 9 to 14 were subjected to a 1 hour sterilization at a temperature of 129° C. in a 2% by weight lactic acid solution after being subjected to a deep drawing test (table 4).

TABLE 4

Sterilization in 2% wt lactic acid solution
(1 hr. at 129° C.) after deep drawing test

|  | Ex. 9 | Ex. 10 | Ex. 11 | Ex. 12 | Ex. 13 | Ex. 14 |
|---|---|---|---|---|---|---|
| Top surface | ok | ok | ok | ok | ok | ok |
| Flank surface | ok | ok | ok | ok | ok | ok |
| First radius (%) | 0 | 0 | 88 | 0 | 78 | 15 |
| Second radius (%) | 39 | 0 | 91 | 58 | 86 | 72 |
| Third radius (%) | 58 | 0 | 91 | 64 | 92 | 86 |
| Fourth radius (%) | 61 | 0 | 94 | 73 | 100 | 90 |

The coatings of Examples 9 to 14 were applied and cured on a flat metal substrate and evaluated for flow, blushing and adhesion (table 5).

TABLE 5

|  | Ex. 9 | Ex. 10 | Ex. 11 | Ex. 12 | Ex. 13 | Ex. 14 |
|---|---|---|---|---|---|---|
| Flow | rough | rough | ok | ok | ok | ok |
| Blushing | 1 | 2 | 1 | 1 | 1 | 2 |
| Crosscut | 1 | 0 | 5 | 5 | 4 | 3 |

The coatings of Examples 9 to 14, applied and cured on a flat surface, were subjected to a 90 minute sterilization at a temperature of 121° C. in a 0.05% by weight cysteine solution and evaluated for flow, blushing and adhesion. The cysteine solution was prepared by adding 0.5 g of cysteine to a 1 liter phosphate buffer solution prepared from 3.56 g $KH_2PO_4$ and 7.22 g $Na_2HPO_4$ (table 6).

TABLE 6

|  | Ex. 9 | Ex. 10 | Ex. 11 | Ex. 12 | Ex. 13 | Ex. 14 |
|---|---|---|---|---|---|---|
| Flow | ok | ok | ok | ok | ok | ok |
| Blushing | 2 | 1 | 1 | 3 | 2 | 3 |
| Crosscut | 0 | 0 | 4 | 2 | 5 | 4 |

Coatings formulations comprising different ratios of the saturated polyester (A) of Example 1 and the unsaturated polyesters (B) of Example 2 and 5 respectively are represented in table 7. In the same table, coating evaluation is reported.

TABLE 7

|  | Example 15 | Example 16 | Example 17 | Example 18 |
|---|---|---|---|---|
| *Coating formulation* | | | | |
| Example 1 | 20 | 20 | 20 | 20 |
| Example 2 | 9.34 | 17.35 | | |
| Example 5 | | | 9.49 | 17.62 |
| Ratio Ex. 1/Ex. 2 | 65/35 | 50/50 | | |
| Ratio Ex. 1/Ex. 5 | | | 65/35 | 50/50 |
| ADDITOL ® XW 6580 | 0.11 | 0.11 | 0.11 | 0.11 |
| *Coating evaluation* | | | | |
| Dry film thickness (μm) | 7 | 12 | 7 | 8 |
| Colour cured lacquer | colourless | colourless | colourless | colourless |
| Flow | 0 | 0 | 0 | 0 |
| Crosscut | 0 | 0 | 0 | 0 |
| Acetone double rubs | 3 | 5 | 16 | 101 |
| Impact test (dir./rev.) | ok | ok | ok | ok |
| Wedge bend test | 74 | 86 | 79 | 86 |
| *Deep drawing test* | | | | |
| Top surface | ok | ok | ok | ok |
| Flank surface | ok | ok | ok | ok |
| First radius (%) | 0 | 0 | 0 | 0 |
| Second radius (%) | 0 | 0 | 0 | 0 |
| Third radius (%) | 0 | 0 | 0 | 0 |
| Fourth radius (%) | 0 | 0 | 0 | 0 |
| *Sterilization in 2% wt lactic acid solution (1 hr. at 129° C.) after deep drawing test* | | | | |
| Top surface | ok, mat | ok, mat | ok, mat | ok, mat |
| Flank surface | ok, mat | ok, mat | ok, mat | ok, mat |
| First radius (%) | 0 | 0 | 0 | 79 |
| Second radius (%) | 0 | 0 | 52 | 100 |
| Third radius (%) | 0 | 0 | 67 | 100 |
| Fourth radius (%) | 0 | attacked | 76 | 100 |
| *Flow, blushing and adhesion after sterilization in 2% wt lactic acid solution (1 hr. at 129° C.)* | | | | |
| Flow | ok | ok | ok | ok |
| Blushing | 4 | 3 | 2 | 2 |
| Crosscut | 0 | 0 | 5 | 5 |
| *Flow, blushing and adhesion after a 90 minute sterilization at a temperature of 121° C. in a 0.05% by weight cysteine solution* | | | | |
| Flow | ok | ok | ok | ok |
| Blushing | 2 | 3 | 2 | 2 |
| Crosscut | 0 | 0 | 1 | 2 |

Coating formulations comprising the unsaturated polyesters (B) of Example 2, Example 3 and Example 4, respectively, in the absence of the saturated polyester (A) of Example 1 (=Example 19, Example 20 and Example 21, respectively) are represented in table 8.

In the same table, coating formulations are represented comprising the unsaturated polyester (B) of Example 4 and the saturated polyester (A) of Example 1 in different ratio's (=Example 22 and Example 23, respectively).

Also a coating formulation comprising the unsaturated polyester (B) of Example 4a and the saturated polyester (A) of Example 1 (=Example 22a) is represented in table 8.

Furthermore, in Table 8, Example 22b is shown, where tetrabutyltitanate is post-added to the paint formulation, as adhesion promotor, compared to Ex. 22a where tetrabutyltitanate was added as esterification catalyst in the synthesis of unsaturated polyester (B). In Ex. 22b monobutyltin oxide was used as esterification catalyst in the synthesis of unsaturated polyester (B).

In the same table, coating evaluation is reported. The coating formulations of Example 19 to 21 are presented as comparative examples. The metal catalyst used in Example 20 is OCTA-SOLIGEN® Iron (Borchers GmbH).

TABLE 8

|  | Ex. 19 | Ex. 20 | Ex. 21 | Ex. 22 | Ex. 22a | Ex. 22b | Ex. 23 |
|---|---|---|---|---|---|---|---|
| *Coating formulation* | | | | | | | |
| Example 1 | | | | 20 | 20 | 20 | 20 |
| Example 2 | 27.8 | | | | | | |
| Example 3 | | 48.7 | | | | | |
| Example 4 | | | 29.3 | 9.83 | | 9.83 | 18.26 |
| Example 4a | | | | | 9.46 | | |
| Ratio Ex. 1/Ex. 4 | | | | 65/35 | | 65/35 | 50/50 |
| Ratio Ex. 1/Ex. 4a | | | | | 65/35 | | |
| ADDITOL ® XW6580 | 0.11 | 0.15 | 0.10 | 0.11 | 0.11 | 0.11 | 0.11 |
| Butyltitanate | | | | | | 0.11 | |
| Metal catalyst * | | 0.23 | | | | | |
| *Coating evaluation* | | | | | | | |
| Dry film thickness (μm) | 7 | 8 | 7 | 7 | 8 | 10 | 7 |
| Colour cured lacquer | colourless | colourless | colourless | colourless | colourless | colourless | colourless |
| Flow | 1 | 1 | 0 | 0 | 0 | 0 | 0 |
| Crosscut | 0 | 0 | 0 | 0 | 0 | 0 | 0 |
| Acetone double rubs | 6 | 6 | >150 | 101 | 126 | >150 | 117 |
| Impact test (dir./rev.) | ok | ok | ok | ok | ok | ok | ok |
| Wedge bend test | 0 | 0 | 82 | 77 | 89 | 89 | 85 |
| *Deep drawing test* | | | | | | | |
| Top surface | ok | ok | ok | ok | ok | ok | ok |
| Flank surface | ok | ok | ok | ok | ok | ok | ok |
| First radius (%) | 0 | 0 | 0 | 0 | 0 | 0 | 0 |
| Second radius (%) | 0 | 0 | 0 | 0 | 0 | 0 | 0 |

TABLE 8-continued

|  | Ex. 19 | Ex. 20 | Ex. 21 | Ex. 22 | Ex. 22a | Ex. 22b | Ex. 23 |
|---|---|---|---|---|---|---|---|
| Third radius (%) | 0 | 0 | 24 | 0 | 0 | 0 | 0 |
| Fourth radius (%) | 0 | 0 | 46 | 0 | 0 | 0 | 0 |
| Sterilization in 2% wt lactic acid solution (1 hr. at 129° C.) after deep drawing test | | | | | | | |
| Top surface | attacked | ok, dis-coloured | attacked | ok, mat | ok, mat | ok, mat | ok, mat |
| Flank surface | attacked | ok, dis-coloured | destroyed | ok, mat | ok, mat | ok, mat | ok, mat |
| First radius (%) | 91 | 0 | 100 | 0 | 0 | 0 | 73 |
| Second radius (%) | 94 | 0 | 100 | 36 | 32 | 0 | 76 |
| Third radius (%) | 91 | 0 | 100 | 45 | 40 | 0 | 76 |
| Fourth radius (%) | 97 | 0 | 100 | 55 | 52 | 20 | 79 |
| Flow, blushing and adhesion after sterilization in 2% wt lactic acid solution (1 hr. at 129° C.) | | | | | | | |
| Flow | ok | ok, dis-coloured | ok | ok | ok | ok | ok |
| Blushing | 4 | 0 | 2 | 2 | 3 | 3 | 2 |
| Crosscut | 5 | 0 | 4 | 1 | 2 | 2 | 4 |
| Flow, blushing and adhesion after a 90 minute sterilization at a temperature of 121° C. in a 0.05% by weight cysteine solution | | | | | | | |
| Flow | attacked | ok, dis-coloured | attacked | ok | ok | ok | ok |
| Blushing | 4 | 0 | 4 | 2 | 2 | 3 | 2 |
| Crosscut | 5 | 0 | 5 | 0 | 2 | 2 | 2 |

* Iron-2-ethylhexanoate (OCTA SOLINGEN ® Iron 7/8)

A comparison of Example 18, comprising a blend of saturated polyester (A) and unsaturated polyester (B), and Example 19 only comprising unsaturated polyester (B) of Example 2, clearly shows the advantageous synergetic effect of coating properties by using a coating formulation comprising a blend of one or more (A) and one or more (B). It is worth mentioning that the binder of Example 18 and comparative Example 19 have the same amount of ethylenically unsaturated bounds.

Coating formulations comprising either the saturated polyesters of Example 1 (=Example 24); or DUROFTAL® VPE 6104/60MPAC, a saturated polyester from Allnex (=Example 25); each in a mixture with PHENODUR® PR 521/60B, a phenolic resin from Allnex, wherein CYCAT® XK 406 N is an acidic catalyst based on phosphoric acid derivate from Allnex, are represented in table 9. The coating compositions were formulated at a solid content of 40% and correspond to formaldehyde containing benchmarks. In the same table, coating evaluation is reported.

TABLE 9

|  | Example 24 | Example 25 |
|---|---|---|
| Coating formulation | | |
| Example 1 (40% solids) | 25 |  |
| DUROFTAL ® VP 6104/60MPAC (60% solids) |  | 18.75 |
| PHENODUR ® PR 521/60B (60% solids) | 5.56 | 6.25 |
| CYCAT ® XK 406N | 0.40 | 0.46 |
| ADDITOL ® XW 6580 | 0.13 | 0.14 |
| Coating evaluation | | |
| Dry film thickness (μm) | 5 | 7 |
| Colour cured lacquer | yellowish | yellowish |
| Flow | 0 | 0 |
| Crosscut | 0 | 0 |
| Acetone double rubs | >150 | 2 |
| Impact test (dir./rev.) | ok | ok |
| Wedge bend test | 10 | 78 |
| Deep drawing test | | |
| Top surface (%) | ok | ok |
| Flank surface (%) | ok | ok |
| First radius (%) | 0 | 0 |
| Second radius (%) | 0 | 0 |
| Third radius (%) | 0 | 0 |
| Fourth radius (%) | 0 | 0 |
| Sterilization in 2% wt lactic acid solution (1 hr. at 129° C.) after deep drawing test | | |
| Top surface | ok | ok |
| Flank surface | ok | ok |
| First radius (%) | 40 | 20 |
| Second radius (%) | 42 | 39 |
| Third radius (%) | 52 | 39 |
| Fourth radius (%) | 58 | 49 |
| Flow, blushing and adhesion after sterilization in 2% wt lactic acid solution (1 hr. at 129° C.) | | |
| Flow | ok | ok |
| Blushing | 3 | 1 |
| Crosscut | 1 | 0 |
| Flow, blushing and adhesion after a 90 minute sterilization at a temperature of 121° C. in a 0.05% by weight cysteine solution | | |
| Flow | ok | ok |
| Blushing | 3 | 3 |
| Crosscut | 0 | 0 |

The above examples of coating formulations according to the present invention (Examples 9 to 18, and Examples 22, 22a, 22b, and 23) clearly present a combination of properties which are equal to or better than the state of the art products in the market (Examples 24 and 25 which are benchmark coating formulations) and better than comparative Examples 19 to 21.

In Ex. 22a, butyltitanate is used as esterification catalyst for the synthesis of the unsaturated polyester of example 4a (as an alternative to monobutyltin oxide used as esterification catalyst for the synthesis of the unsaturated polyester of Example 4 which is used in the formulations in Ex. 22 and Ex. 22b). The results show that butyltitanate can be used as esterification catalyst for polyester formation, as an alternative to tin derivatives.

Furthermore, the presence of butyltitanate in the coating formulation, coming from the polyester esterification catalyst (Ex. 22a) or added to the coating formulation upon its preparation (Ex. 22b), results in an overall improvement of the coating performances. In particular, when butyltitanate is added to the coating formulation upon its preparation (Ex. 22b), a substantial improvement of the coating performances is observed after the sterilization tests (i.e. leading to improved sterilization performance of the coating without compromising the other properties thereof).

The invention claimed is:

1. A coating composition comprising a blend of polyesters, said blend comprising:
   from 0.1 to 99.9% by weight of one or more saturated polyesters (A), and
   from 99.9 to 0.1% by weight of one or more unsaturated polyesters (B),
   based on the total weight of polyesters (A) and (B);
   said one or more (A) and one or more (B) having a Weight Average Molecular Weight (Mw) of at least 15,000 g/mole, as measured by Gel Permeation Chromatograph using tetrahydrofuran as solvent, and a glass transition temperature, as measured by Differential Scanning Calorimetry, according to DIN EN 61006, method A, of at least 60° C.

2. The coating composition according to claim 1, wherein the one or more (A) and/or the one or more (B) comprise one or more aliphatic cyclic group(s).

3. The coating composition according to claim 1 wherein the one or more (A) and/or the one or more (B) comprise(s) aliphatic polycyclic groups.

4. The coating composition according to claim 1, wherein the one or more (A) and the one or more (B) have a Weight Average Molecular Weight (Mw) comprised between 20,000 and 50,000 g/mole and/or a glass transition temperature comprised between 8° and 120° C.

5. The coating composition according to claim 1,
   wherein the one or more (B) is (are) the reaction product of:
      an acid constituent comprising from 50 to 90 mole percentage of terephthalic acid and/or isophthalic acid, from 10 to 50 mole percentage of one or more unsaturated diacid(s) or the anhydride thereof, and from 0 to 30 mole percentage of one or more saturated aliphatic, saturated cycloaliphatic or aromatic diacid(s) or their anhydride, and
      a glycol constituent, comprising from 5 to 30 mole percentage of one or more aliphatic and/or cycloaliphatic diol(s), and from 70 to 95 mole percentage of one or more aliphatic polycyclic diol(s); and/or
   wherein the one or more (A) is (are) the reaction product of:
      an acid constituent comprising from 50 to 100 mole percentage of terephthalic acid and/or isophthalic acid, and from 0 to 50 mole percentage of one or more saturated aliphatic, saturated cycloaliphatic or aromatic diacid(s) or their anhydride, and
      a glycol constituent, comprising from 5 to 30 mole percentage of one or more aliphatic and/or cycloaliphatic diol(s), and from 70 to 95 mole percentage of one or more aliphatic polycyclic diol(s).

6. The coating composition according to claim 5, wherein the one or more aliphatic polycyclic diol(s) of the one or more (A) and/or the one or more (B) comprise(s) diols selected from the group consisting of bicyclic diols and tricyclic diols and mixtures thereof.

7. The coating composition according to claim 5, wherein the one or more aliphatic polycyclic diol(s) of the one or more (A) and/or the one or more (B) comprise(s) a hetero-bicyclic diol, said hetero-bicyclic diol having a bicyclic aliphatic ring wherein in said ring one or more hydrocarbon(s) is (are) replaced by a hetero atom, and said hetero-bicyclic diol being selected from the group consisting of isosorbide, isomannide, isoidide, and derivatives thereof.

8. The coating composition according to claim 5, wherein the one or more aliphatic polycyclic diol(s) of the one or more (A) and/or the one or more (B) comprise(s) a tricyclic diol selected from the group consisting of 3,8-bis(hydroxymethyl)-tricyclo[$5.2.1.0^{2,6}$]decane, 4,8-bis(hydroxymethyl)-tricyclo[$5.2.1.0^{2,6}$]decane, and 5,8-bis-(hydroxymethyl)-tricyclo[$5.2.1.0^{2,6}$]decane, and mixtures thereof.

9. The coating composition according to claim 5, wherein the one or more unsaturated diacid(s) or anhydride(s) of the one or more (B) is (are) selected from the group consisting of alpha, beta-unsaturated dicarboxylic acids; alpha, beta-unsaturated acid anhydrides, unsaturated diacids comprising an isolated ethylenically unsaturated double bond; unsaturated acid anhydrides comprising an isolated ethylenically unsaturated double bond, and mixtures thereof.

10. The coating composition according to claim 5, wherein the one or more unsaturated diacid(s) or anhydride(s) of the one or more (B) is (are) selected from the group consisting of maleic acid, fumaric acid, itaconic acid, mesaconic acid, citraconic acid, tetrahydrophthalic acid, nadic acid, methyl nadic acid, or their anhydrides, and mixtures thereof.

11. The coating composition according to claim 1, wherein the one or more (B) has (have) an unsaturated equivalent weight comprised between 300 and 6,000 g/equiv.

12. The coating composition according to claim 1, wherein the one or more (A) is (are) the reaction product of terephthalic acid, 1,4-butanediol, and a mixture of 3,8-bis(hydroxymethyl)-tricyclo[$5.2.1.0^{2,6}$]decane; 4,8-bis(hydroxymethyl)-tricyclo[$5.2.1.0^{2,6}$]decane, and 5,8-bis-(hydroxymethyl)-tricyclo[$5.2.1.0^{2,6}$]decane.

13. The coating composition according to claim 1, wherein the one or more (B) is (are) the reaction product of terephthalic acid, maleic anhydride and/or fumaric acid, 1,4-butanediol, and a mixture of 3,8-bis(hydroxymethyl)-tricyclo[$5.2.1.0^{2,6}$]decane, 4,8-bis(hydroxymethyl)-tricyclo[$5.2.1.0^{2,6}$]decane, and 5,8-bis-(hydroxymethyl)-tricyclo[$5.2.1.0^{2,6}$]decane.

14. The coating composition according to claim 1, comprising between 35 and 50% by weight of the blend comprising one or more (A) and one or more (B) and between 50 and 65% by weight of one or more organic solvent(s) selected from the group consisting of aliphatic hydrocarbons, aromatic hydrocarbons, alcohols, ketones, esters, glycols, glycol ethers, and glycol esters, and mixtures thereof.

15. The coating composition according to claim 1 comprising one or more additives selected from the group consisting of carriers, additional polymers, emulsifiers, pigments, metal powders or paste, fillers, anti-migration aids, anti-microbials, extenders, lubricants, coalescents, wetting agents, biocides, plasticizers, crosslinkers, crosslinking catalysts, antifoaming agents, colorants, waxes, anti-oxidants, anticorrosion agents, flow control agents, thixotropic agents, dispersants, adhesion promoters, UV stabilizers and scavenger agents.

16. The coating composition according to claim 1 comprising between 0.05% and 1.5% by weight of an adhesion promoter, based on the weight of nonvolatile material in the coating composition.

17. The coating composition according to claim 1 comprising between 0.05% and 1.5% by weight of tetraalkyltitanate, based on the weight of nonvolatile material in the coating composition.

18. The coating composition according to claim 1 comprising less than 10,000 ppm of constituents selected from the group consisting of Bisphenol-A, formaldehyde, and isocyanates, and mixtures thereof.

19. Unsaturated polyester (B) being the reaction product of:
   an acid constituent comprising from 50 to 90 mole percentage of terephthalic acid and/or isophthalic acid, from 10 to 50 mole percentage of one or more unsaturated diacid(s) or the anhydride thereof, and from 0 to 30 mole percentage of one or more saturated aliphatic, saturated cycloaliphatic or aromatic diacid(s) or their anhydride, and
   a glycol constituent, comprising from 5 to 30 mole percentage of one or more aliphatic and/or one or more cycloaliphatic diol(s), and from 70 to 95 mole percentage of one or more aliphatic polycyclic diol(s), and having
   a Weight Average Molecular Weight of at least 15,000 g/mol, as measured by Gel Permeation Chromatograph using tetrahydrofuran as solvent,
   a glass transition temperature, as measured by Differential Scanning Calorimetry, according to DIN EN 61006, method A, of at least 60° C., and
   an unsaturated equivalent weight comprised between 300 and 6,000 g/equiv.

20. A substrate selected from the group consisting of metal, glass, polymers, composites, concrete, ceramics and engineered wood coated with a composition according to claim 1.

21. The substrate according to claim 20, wherein the substrate is a metal coil or can.

22. A method for producing a coated metal substrate comprising the steps of:
   applying the coating composition of claim 1 on at least one side of a metal substrate, at a coating thickness adjusted to obtain a dry coating thickness of less than 60 μm; and
   stoving the applied coating composition at a temperature of at least 150°C. for a period of at least 20 seconds, to form the metal substrate coated with the cross-linked coating layer.

23. A method for producing coated can bodies and can ends comprising the steps of:
   cutting the coated metal substrate of claim 22 into metal pieces of desired dimensions and shape to form a can body and can ends, ready to be assembled, or
   cutting the coated metal substrate of claim 22 into metal pieces of desired dimensions and shape and embossing a metal piece into a can body and cutting the can ends into the desired shape, ready to be assembled.

* * * * *